United States Patent [19]
Davida et al.

[11] 4,202,051
[45] May 6, 1980

[54] DIGITAL DATA ENCIPHERING AND DECIPHERING CIRCUIT AND METHOD

[75] Inventors: George I. Davida; David L. Wells, both of Milwaukee, Wis.

[73] Assignee: Wisconsin Alumni Research Foundation, Madison, Wis.

[21] Appl. No.: 839,034

[22] Filed: Oct. 3, 1977

[51] Int. Cl.² .............................................. H04L 9/04
[52] U.S. Cl. ...................................... 375/2; 364/717; 331/78
[58] Field of Search ........................... 178/22; 331/78; 364/717

[56] References Cited

U.S. PATENT DOCUMENTS

| | | | |
|---|---|---|---|
| 3,728,529 | 4/1973 | Kartchner et al. ................ | 178/22 |
| 3,781,473 | 12/1973 | Goode et al. ..................... | 178/22 |
| 3,796,830 | 3/1974 | Smith .............................. | 178/22 |
| 3,911,216 | 10/1975 | Bartek et al. .................... | 178/22 |
| 3,946,215 | 3/1976 | May ................................. | 364/717 |
| 3,962,539 | 6/1976 | Ehrsam et al. .................... | 178/22 |
| 4,004,089 | 1/1977 | Richard et al. ................... | 178/22 |
| 4,032,763 | 6/1977 | Glitz ............................... | 364/717 |
| 4,115,657 | 9/1978 | Morgan ............................. | 178/22 |

*Primary Examiner*—Howard A. Birmiel
*Attorney, Agent, or Firm*—Howard W. Bremer; Robert W. Cook

[57] ABSTRACT

A digital data enciphering and deciphering circuit and method for transforming a plaintext signal into an enciphered signal which is secure during transmission. After receipt, the enciphered signal is transformed back into the original plaintext signal by use of the same circuit and method. A key generator circuit is used to generate a key having certain properties of randomness, including non linear relationships among key bits. The key is combined with the plaintext signal in the data enciphering circuit to produce an enciphered signal and the same key is also combined with the enciphered signal in the data deciphering circuit to produce the plaintext signal.

5 Claims, 3 Drawing Figures

4,202,051

DIGITAL DATA ENCIPHERING AND DECIPHERING CIRCUIT AND METHOD

BACKGROUND OF THE INVENTION

The Government has rights in this invention pursuant to Grant No. NSF-77-36-DCR 74-23653 and IPA No. 0001 awarded by the National Science Foundation.

This invention relates to the secure transmission of digital data messages and more particularly to a key generator circuit and method for use in a digital data enciphering and deciphering circuit.

When data is transmitted by a means that is not secure against interception by a party that would misuse the data (an enemy) it is necessary to encipher the data so that if it is intercepted, the enemy will not be able to obtain any useful information from it. High security applications have always existed, e.g., in military and government service; however, recently industrial espionage has reached major proportions requiring the use of data enciphering. The current trend toward the use of remote access networks for the transmission of data, especially where these networks are carried over vulnerable commercial telephone facilities, has resulted in an increased need for data enciphering. It is possible for the enemy to employ an expert called a cryptanalyst to break the cipher, after which the enemy can decipher the intercepted data himself. As cryptanalysts have become better at breaking ciphers, aided by sophisticated computers, more difficult ciphers have been developed in order to maintain data security. The value of any given data enciphering and deciphering technique is measured by how much effort must be expended in order to break it.

One prior art cipher method is performed by using a table with the alphabet in one column and a scrambled alphabet in another column such that for each letter there is one and only one corresponding letter. The original message which it is desired to encipher, called plaintext, is enciphered by looking each letter up in the table and changing it to the corresponding letter. The result, which is called ciphertext, is no longer meaningful to an ordinary person. The cryptanalyst can easily break this cipher, however, by taking advantage of certain information, e.g., the true identity of letters can be determined by their frequency of occurrence, since the average frequency of occurrence of each letter in the alphabet is well known.

Another prior art cipher method uses a key, which is added to the plaintext to produce ciphertext at the transmitter end and then the same key is subtracted from the ciphertext at the receiver end to produce plaintext again. If the key is truly random and never repeats then the cipher cannot be broken, however, the practical problems associated with giving each end of the transmission path a sufficiently long random key (it would have to be as long as the sum total of all of the messages that will ever be sent) prevent the use of such a method. One practical prior art method is to utilize a linear feedback shift register to generate a pseudorandom key. Although this method results in a key with many random properties, it does have certain properties which allow a cryptanalyst to break it, given enough time and computing facilities.

It is an object of this invention to generate pseudorandom keys which do not contain the properties which allow a cryptanalyst to easily break the cipher, but rather make the task of the cryptanalyst so difficult that it is for all practical purposes impossible.

SUMMARY OF THE INVENTION

In accordance with the present invention a circuit for enciphering and deciphering digital data comprises a linear feedback shift register having inputs connected to a start signal which is used to start the enciphering and deciphering circuit at the beginning of its operation and a clock signal. The linear feedback shift register circuit generates a linear pseudorandom signal at an output connected to an input of a non linear finite state machine. The non linear finite state machine also has inputs connected to the start signal and the clock signal. The non linear finite state machine transforms the linear pseudorandom signal present at one of its inputs into a non linear pseudorandom signal present at an output connected to an input of a combining circuit. The combining circuit also has an input connected to a data input and generates a transformed data signal at a data output. This same circuit may be used for both enciphering and deciphering digital data, since if a plaintext signal is applied at the data input, then an enciphered signal is produced at the data output, whereas if an enciphered signal is applied at the data input, then a plaintext signal is produced at the data output.

BRIEF DESCRIPTION OF THE DRAWING

A digital data enciphering and deciphering circuit according to this invention will be better understood from a consideration of the detailed description of the organization and operation of one illustrative embodiment thereof which follows when taken in conjunction with the accompanying drawing, in which.

DETAILED DESCRIPTION

Figure 1:
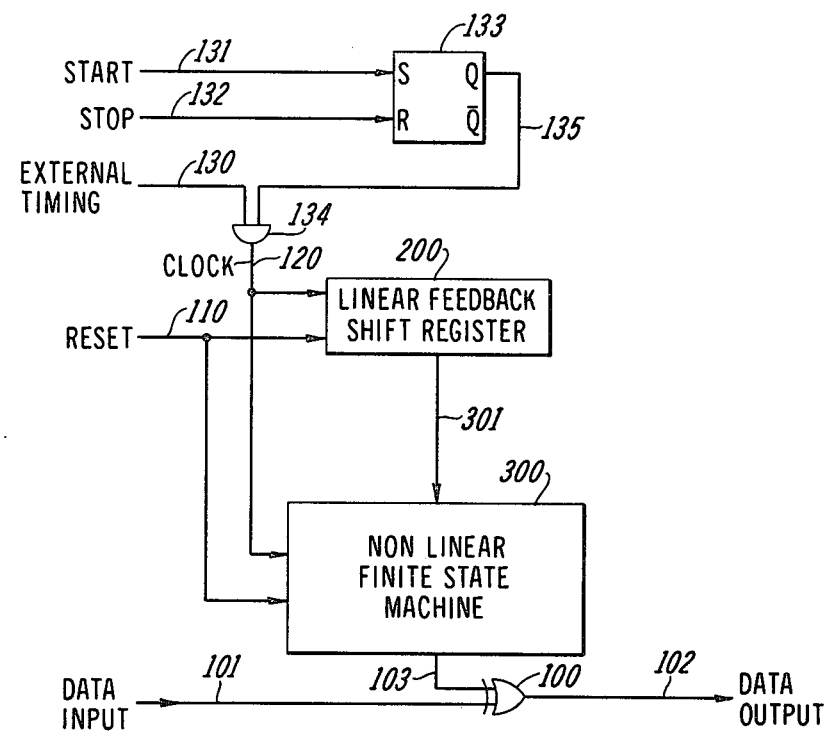
FIG. 1 depicts an exemplary digital data enciphering and deciphering circuit according to the invention.

One illustrative digital data enciphering and deciphering circuit according to the invention is shown in FIG. 1 comprising a combining circuit 100 for transforming digital data presented at one input of the combining circuit 100 over a conductor 101 into transformed digital data at an output of the combining circuit 100 over a conductor 102. A second input of combining circuit 100 is connected to a non linear finite state machine 300 by means of a conductor 103. The non linear finite state machine 300 generates a non linear pseudorandom signal called a key. The combining circuit 100 shown in this illustrative example is an EXCLUSIVE OR gate which is well known in the art. An EXCLUSIVE OR gate for use with binary signals functions in the following manner: if both inputs have the same signal present then the output is a '0' and if the two inputs have a different signal present on each one then the output is a '1.' An EXCLUSIVE OR gate also performs the function of addition base 2, i.e., modulo 2.

When a key is added modulo 2 to digital data then the result is data which is transformed such that neither of the input signals can be recovered without the knowledge of the other one. If it is desired to encipher certain plaintext digital data then it can be combined with a key in an EXCLUSIVE OR circuit to produce an enciphered signal. In order to change the enciphered signal back into plaintext, the enciphered signal is transformed again in the same circuit or a circuit identical to the one used to encipher it and using the same key signal.

The non linear finite state machine 300 receives a linear pseudo random signal from a linear feedback shift register 200 over a conductor 301. The linear pseudo random signal has certain random properties, however it also has an undesirable linear relationship among the various bits of the signal. These linear relationships make it relatively easy for a cryptanalyst, that is one who is trained to break or decipher codes, to reconstruct the entire key by knowing only a small portion of it. It is possible for an enemy's cryptanalyst to obtain a small portion of the key in a number of ways, for example, by having an accomplice introduce a known message into the system and then recovering the corresponding enciphered message. The key may be readily obtained from the combination of the plaintext and enciphered messages thus obtained. In order to prevent this method of attack it is desirable to destroy the linearity of the key signal so that if a portion of the key is obtained the whole can't be generated from it, however, it is difficult to generate a key signal which is both non linear and also has the required statistical properties of a random sequence. The purpose of the non linear finite state machine 300 is to transform the linear pseudo random signal present at its input into a non linear signal without destroying the randomness of the signal. This process is performed by a certain design of the finite state machine 300 as will be discussed later.

The non linear finite state machine 300 has an input which receives a reset signal over a conductor 110. It is necessary for the non linear finite state machine 300 to be started at a known first state by applying a reset signal on conductor 110 in order that both the enciphering circuit and the deciphering circuit will generate the identical key signal for a given digital data message. The non linear finite state machine 300 has another input which receives a clock signal over a conductor 120. All of the signals present on conductors 101, 102, 103, and 301 are serial signals, i.e., one bit is transmitted at a time. It is necessary to define when a bit starts and stops and it is the function of the clock signal to indicate the start of each serial bit.

The linear feedback shift register 200 generates a pseudo random signal which is transmitted to the non linear finite state machine 300 over a conductor 301. The linear feedback shift register 200 has one input which receives a reset signal over a conductor 110. The reset signal is used for the same purpose mentioned above, i.e., to start the generation of pseudo random signals at a known place so that the same sequence can be reproduced for the enciphering and deciphering circuits. The linear feedback shift register 200 has another input that receives a clock signal over conductor 120 in order to indicate the beginning of each new bit of data so that the linear feedback shift register can produce a new bit in the pseudorandom sequence. A linear feedback shift register such as is contemplated here is well known, for example, see Carl H. Meyer, "Enciphering Data for Secure Transmission," *Computer Design*, April, 1974, pages 129 through 134.

An external timing signal or raw clock signal is received over conductor 130 from some external circuit. The external timing signal is used to generate a clock signal for use within the digital data enciphering and deciphering circuit as previously described. The same circuit that provides the data input on conductor 101 would probably provide the external timing signal so that the data input would be properly coordinated with the operation of the digital data enciphering and deciphering circuit. A start signal is received over conductor 131 and is used to start the operation of the digital data enciphering and deciphering circuit. A stop signal is received over conductor 132 and is used to stop the operation of the digital data enciphering and deciphering circuit. An R S flip-flop 133 is used to remember the start or stop state of the digital data enciphering and deciphering circuit. An R S flip-flop receives inputs on an S or set input and an R or reset input and has a Q output. The Q output is a '1' if the last signal received by the R S flip-flop was on the S input and a '0' if the last signal received by the R S flip-flop was on the R input. R S flip-flop 133 has an S input connected to the Start input by means of conductor 131 and an R input connected to the Stop input by means of conductor 132. The Q output of R S flip-flop 133 is connected to an input of an AND gate 134 by means of a conductor 135. A second input of the AND gate 134 is connected to the external timing input by means of conductor 130, and the output of the AND gate 134 is connected to the clock inputs of linear feedback shift register 200 and non linear finite state machine 300 by means of conductor 120. AND gate 134 functions to generate a clock signal on conductor 120 only when there is an external timing signal present on conductor 130 and the start stop R S flip-flop 133 is in the start state, i.e., the Q output thereof is a '1.'

Figure 2:
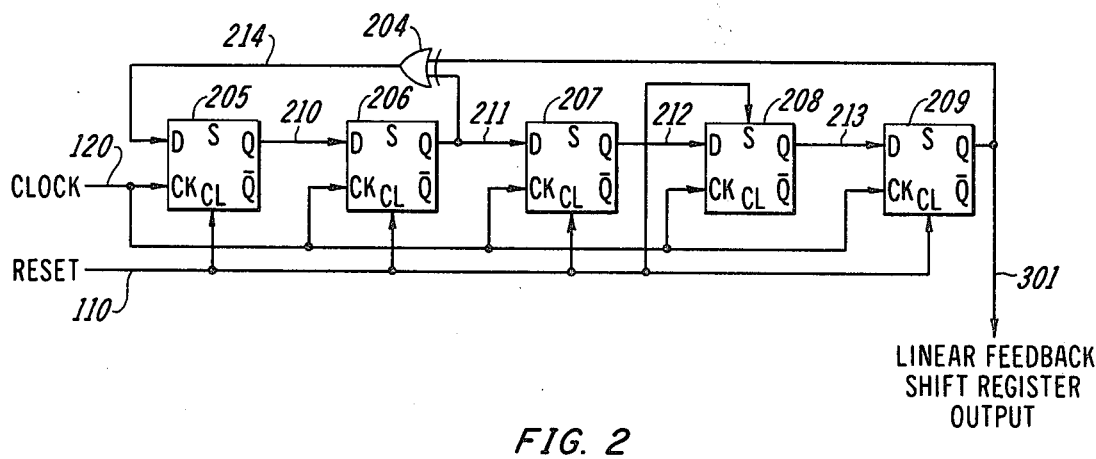
FIG. 2 depicts an exemplary linear feedback shift register for use in the circuit of FIG. 1.

A linear feedback shift register 200 such as is contemplated for use in this invention is shown in FIG. 2 in more detail. The linear feedback shift register 200 is constructed from an EXCLUSIVE OR gate 204, constructed the same as EXCLUSIVE OR gate 100 described above and a number of D flip-flops; 205, 206, 207, 208, and 209. The construction of D flip-flops such as is contemplated here is well known, for example, Edwin E. Klingman, "Microprocessor Systems Design," *Prentice-Hall, Inc.*, 1977, pages 45 through 46 and Dual D-type edge triggered flip-flop, type 7474 in Signetics Digital Catalog, 1972, pages 2–72 through 2–73. Such a D flip-flop has two outputs, a Q or true output and a $\bar{Q}$ or compliment output which is always the compliment of the Q output. A D input is provided for the application of the input data signal and a CK input is provided for the application of the clock signal. When the clock signal is a '1,' the input data present at the D input is gated to the Q output. A '1' signal at the S input will set the Q output to a '1' regardless of the state of the D and CK inputs. A '1' signal at the CL input will clear the Q output to a '0' regardless of the state of the D and CK inputs.

D flip-flops 205 through 209 are connected in series as a shift register, i.e., the Q output of D flip-flop 205 is connected to the D input of D flip-flop 206 by means of a conductor 210, the Q output of D flip-flop 206 is connected to the D input of D flip-flop 207 by means of a conductor 211, the Q output of D flip-flop 207 is connected to the D input of D flip-flop 208 by means of a conductor 212, and the Q output of D flip-flop 208 is connected to the D input of D flip-flop 209 by means of a conductor 213. Feedback is provided by the output of EXCLUSIVE OR gate 204 being connected to the D input of D flip-flop 205 by means of a conductor 214. The inputs of EXCLUSIVE OR gate 204 are connected to the outputs of D flip-flops 206 and 209 by means of conductors 211 and 301, respectively. The CK inputs of D flip-flops 205 through 209 are each connected to the clock signal input by means of conductor 120. Each time a clock signal is present D flip-flops 206 through 209 each receive the previous contents of the predecessor D flip-flops 205 through 208, respectively. At the same time D flip-flop 205 receives the modulo 2 sum of the previous contents of D flip-flops 206 and 209. The CL inputs of D flip-flops 205, 206, 207, and 209 and the S input of D flip-flop 208 are connected to the reset signal input by means of conductor 110. When the reset input is activated, it causes the Q outputs of D flip-flops 205 through 209 to be set to '00010' respectively. Many other similar linear feedback shift registers may be constructed according to well known methods by changing the number of D flip-flops in the register, the number and location of feedback paths and corresponding EXCLUSIVE OR gates, and the CL and S input connections to the reset signal. According to well known construction methods, maximal length period shift registers with n stages or flip-flops, will produce random sequences of bits of length $2^n - 1$.

Figure 3:
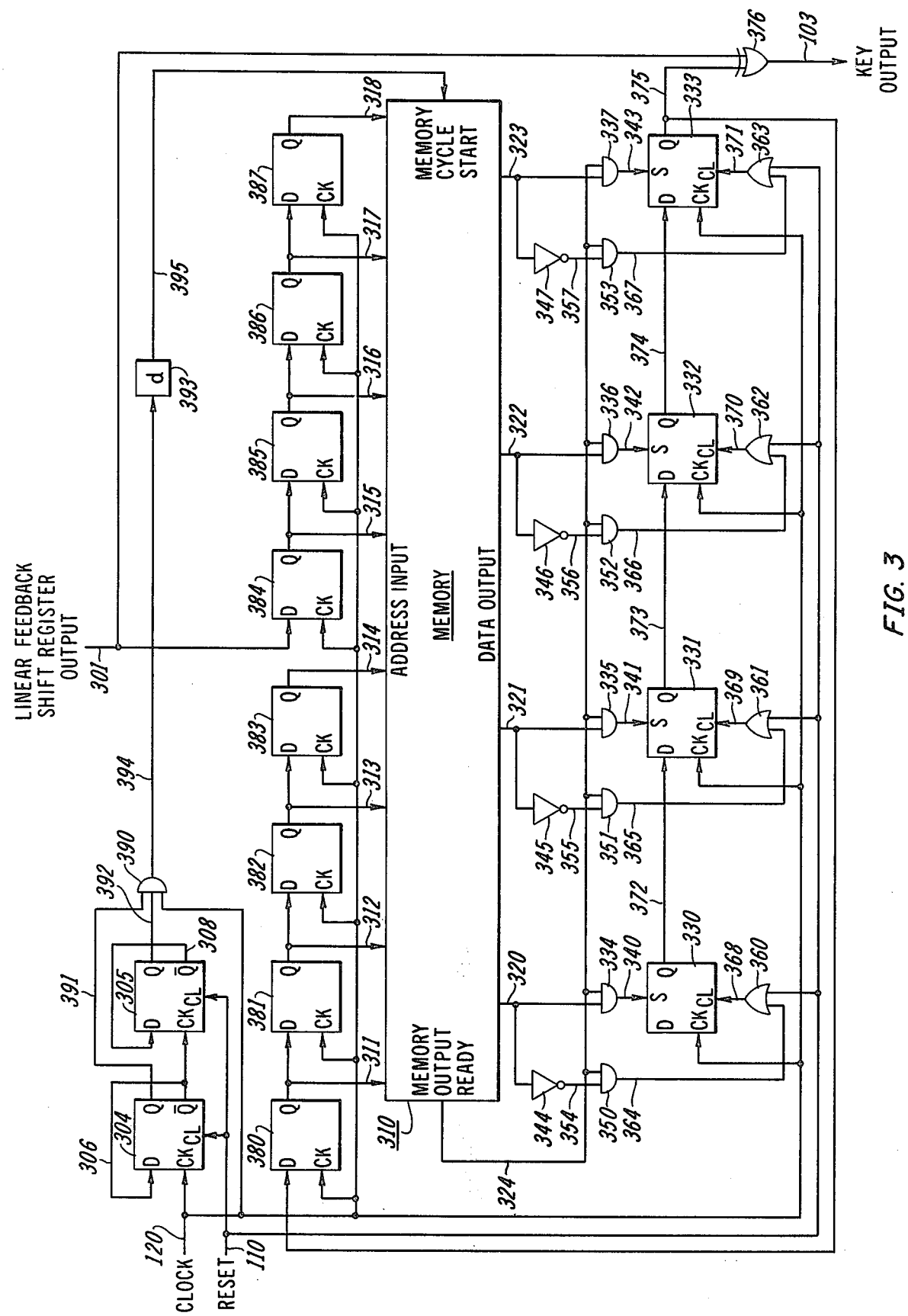
FIG. 3 depicts an exemplary non linear finite state machine for use in the circuit of FIG. 1.

A non linear finite state machine 300 such as is contemplated for use in this invention is shown in FIG. 3 in more detail. D flip-flops 304 and 305 are connected as a binary counter in order to generate a signal at the Q output of D flip-flop 305 after four clock signals have been presented at the CK input of D flip-flop 304. The clock signal is connected to the CK input of D flip-flop 304 and a first input of an AND gate 390 by means of conductor 120, the $\overline{Q}$ output of D flip-flop 304 is connected to the D input of D flip-flop 304 and the CK input of a D flip-flop 305 by means of a conductor 306 and the Q output of D flip-flop 304 is connected to a second input of the AND gate 390 by means of a conductor 391. The $\overline{Q}$ output of D flip-flop 305 is connected to the D input of D flip-flop 305 by means of a conductor 308. The Q output of D flip-flop 305 is connected to an input of AND gate 390 by means of a conductor 392. The output of AND gate 390 is connected to the input of a delay element 393 by means of a conductor 394. A delay element such as is contemplated for use in this invention is well known and performs the function of delaying the signal presented at the input by a small time and then presenting the same signal at the output thereof. The output of delay element 393 is connected to the memory cycle input of memory 310 by means of conductor 395. AND gate 390 and delay element 393 function to generate a memory cycle start signal at the corresponding input of memory 310 coincident with every fourth clock signal presented on conductor 120.

The memory 310 is used to store the definition of the particular characteristics of the non linear finite state machine 300. After the memory 310 receives a memory start signal via conductor 395, the memory 310 will read the word at the address present at the address inputs of memory 310 by means of conductors 311 through 318. The resulting data word is presented at the data outputs of memory 310 and is connected to other circuits via conductors 320 through 323. The memory 310 indicates the presence of valid data at the data output terminals by generating a 'memory output ready' signal at the 'memory output ready' output. The 'memory output ready' signal is used to gate the data output of the memory 310 into D flip-flops 330 through 333 in the following manner: the memory data output is connected to a first input of AND gates 334 through 337 by means of conductors 320 through 323, the 'memory output ready' signal is connected to a second input of AND gates 334 through 337 by means of conductor 324 and the outputs of AND gates 334 through 337 are connected respectively to the S inputs of D flip-flops 330 through 333 by means of conductors 340 through 343 whereby D flip-flops 330 through 333 are set to '1' if a '1' data output is generated by the memory 310 on the corresponding data output bit when the 'memory output ready' signal is active on conductor 324. The memory data output is also connected to an input of INVERTOR gates 344 through 347 by means of conductors 320 through 323, respectively. INVERTOR gates are well known and perform the function of generating at the output the binary compliment of the signal present at the input thereof. The outputs of INVERTOR gates 344 through 347 are connected to inputs of AND gates 350 through 353 by means of conductors 354 through 357, respectively. A second input of each of AND gates 350 through 353 is connected to the 'memory output ready' output from memory 310 by means of conductor 324 and the output of AND gates 350 through 353 are connected to inputs of OR gates 360 through 363 by means of conductors 364 through 367, respectively. A second input of each of OR gates 360 through 363 is connected to the reset input by means of conductor 110 and the output of OR gates 360 through 363 are connected to the CL inputs of D flip-flops 330 through 333 by means of conductors 368 through 371 respectively. The function of this circuitry is such that if either the reset input has an active signal or the corresponding data output bit of memory 310 has a '0' signal present at the time the 'memory output ready' output of memory 310 has an active signal present, then the corresponding flip-flop of D flip-flops 330 through 333 will be cleared to a value of '0.'

The Q output of D flip-flop 330 is connected to the D input of D flip-flop 331 by means of a conductor 372, the Q output of D flip-flop 331 is connected to the D input of D flip-flop 332 by means of a conductor 373, the Q output of D flip-flop 332 is connected to the D input of D flip-flop 333 by means of a conductor 374 and the Q output of D flip-flop 333 is connected to an input of EXCLUSIVE OR gate 376 by means of a conductor 375. A second input of EXCLUSIVE OR gate 376 is connected to the input from the linear feedback shift register 200 by means of a conductor 301 and the desired key signal is generated at the output of EXCLUSIVE OR gate 376, which is connected to an input of EXCLUSIVE OR gate 100 by means of conductor 103. The D flip-flops 330 through 333 are successively shifted right a bit at a time and combined with the output of the linear feedback shift register 200 in order to generate a non linear pseudo random key at the output of EXCLUSIVE OR gate 376.

The Q output of D flip-flop 333 is also connected to the D input of a D flip-flop 380 by means of conductor 375, the Q output of D flip-flop 380 is connected to the D input of a D flip-flop 381 by means of a conductor 311, the Q output of D flip-flop 381 is connected to the D input of a D flip-flop 382 by means of conductor 312, and the Q output of D flip-flop 382 is connected to the D input of a D flip-flop 383 by means of a conductor 313. The Q outputs of D flip-flops 380 through 383 are connected to the address input of memory 310 by means of conductors 311 through 314, respectively. D flip-flops 330 through 333 thereby receive the memory data output word which then forms part of the address for the next memory access.

The input from the linear feedback shift register 200 is also connected to the D input of a D flip-flop 384 via conductor 301, the Q output of D flip-flop 384 is connected to the D input of a D flip-flop 385 by means of conductor 315, the Q output of D flip-flop 385 is connected to the D input of a D flip-flop 386 by means of conductor 316, and the Q output of D flip-flop 386 is connected to the D input of a D flip-flop 387 by means of conductor 317. The Q outputs of D flip-flops 384 through 387 are connected to certain address input bits of memory 310 by means of conductors 315 through 318, respectively. The D flip-flops 384 through 387 thereby receive the output of the linear feedback shift register which then forms part of the address for the next memory access.

The clock signal is connected by means of conductor 120 to the CK input of each of D flip-flops 304, 330, 331, 332, 333, 380, 381, 382, 383, 384, 385, 386, and 387 whereby the circuit operates in a synchronous manner, changes in state occurring in response to clock pulses.

In order to retain the random properties of the linear pseudo random signal after it is transformed into a non linear pseudo random signal by the non linear finite state machine 300, it is necessary to place certain restraints upon the contents of memory 310. The data output which results from each memory access is used as part of the address for the next memory access. The remainder of the address comprises the linear pseudo random signal from linear feedback shift register 200. This addressing process may be thought of as the memory data output being used to specify a block of memory within the entire memory and the linear feedback shift register output being used to specify a particular word within that block. The restraint upon the memory contents is that the words within each block must be evenly distributed with respect to their contents, i.e., all possible contents must occur the same number of times. Within this constraint many different memory contents may be specified to result in the desired non linear transformation.

An illustrative operation of the digital data enciphering and deciphering circuit may now be considered. The operation of the digital data enciphering and deciphering circuit begins with a reset signal which is applied to the reset input and thereby to conductor 110 and to the appropriate flip-flops in the linear feedback shift register 200 and the non linear finite state machine 300. As mentioned previously, the flip-flops 205 through 209 in the linear feedback shift register 200 are set to '00010' respectively by the reset signal via conductor 110. In the non linear finite state machine 300, D flip-flops 304, 305, 330, 331, 332, and 333 are all cleared to '0.' The initial contents, i.e., the contents after a reset signal, of D flip-flops 205 through 209 and 330 through 333 are determined by the particular circuit used with respect to the S and CL inputs. Any arbitrary initial contents may be selected for use with such a circuit. Also if it is desired to change the initial contents from time to time the circuit may be designed to allow switch settings or other programmable means for specifying the initial contents.

A start signal is now applied to the digital data enciphering and deciphering circuit at the start input thereof, whereby R S flip-flop 133 is set. Before the first clock pulse is received on conductor 110 the key signal at the output of EXCLUSIVE OR gate 376 is a '0' since the inputs from D flip-flops 209 and 333 are '0' and '0,' respectively. If we assume, for example, that it is desired to encipher the plaintext message '10110001' then the first input presented on the data input is the low order bit of the plaintext message, i.e., a '1.' The output of EXCLUSIVE OR gate 376, a '0,' and the data input, a '1,' are connected to inputs of EXCLUSIVE OR gate 100 by means of conductors 103 and 101, respectively, whereby the output of EXCLUSIVE OR gate 100 and also the data output are '1.' When the first clock input occurs, the content of D flip-flop 209 is replaced by the content of D flip-flop 208, namely a '1,' the content of D flip-flop 333 is replaced by the content of D flip-flop 332, namely a '0,' and therefore the output of EXCLUSIVE OR gate 376 becomes a '1.' The plaintext input present on the data input will change to a '0' and, therefore, the output of EXCLUSIVE OR gate 100 and the data output or enciphered message will be a '1.' The next two clock signals cause similar results, the shift register composed of D flip-flops 205 through 209 shifts right one place each time and the data output shift register composed of D flip-flops 330 through 333 shifts right one place each time also. The next two outputs of EXCLUSIVE OR gate 376 will therefore be '0' and '0' respectively, and the next two outputs of EXCLUSIVE OR gate 100 will therefore be '0' and '0' respectively.

The fourth clock input signal will cause a number of things to occur. First, the contents of the four D flip-flops 330 through 333, namely '0000,' have been shifted into the four D flip-flops 380 through 383 to form part of the memory address. The first four output bits of the linear feedback shift register 200 will have been shifted into the four D flip-flops 384 through 387, namely '0010,' to form part of the memory address. The counter formed by D flip-flops 304 and 305 will reach a count of binary '11' and will generate a memory cycle start signal on the output of AND gate 390. As a result of the memory cycle start signal being connected to the memory cycle start input of memory 310, a word will be read from memory 310 at address '00000010' into D flip-flops 330 through 333, for example '1010.' Now the digital data enciphering and deciphering circuit will operate for the next four clock periods in similar fashion as it operated during the first four clock periods, except that the contents of the linear feedback shift register have changed from the initial contents. D flip-flop 209 now has a '0' in it, i.e., present at the Q output thereof. The '0' present in D flip-flop 209 was originally in D flip-flop 205 and has been successively shifted right once during each clock signal input. After the first clock signal was received, the contents of D flip-flop 205 was replaced by the EXCLUSIVE OR of the previous contents of D flip-flops 206 and 209, namely a '0.' At successive clock signal inputs new bits are generated and fed into the left hand end of the shift register, i.e., D flip-flop 205, such that the contents of D flip-flops 205 through 209 at the end of four clock signal inputs are '10100' respectively. After another four clock signal inputs the digital data enciphering and deciphering circuit will have generated the following key at the output of EXCLUSIVE OR gate 376, '11100010,' which when combined with the plaintext message, '10110001,' yields the enciphered message '01010011.' If the digital data enciphering and deciphering circuit of this example, or an identical one at a receiver location is initialized by means of a reset signal, started by means of a start signal and then the enciphered message '01010011' is used as the data input, which is combined with the same key, '11100010,' the original plaintext signal, '10110001,' is generated at the output thereof.

What has been described is considered to be only a specific illustrative embodiment of the invention and it is to be understood that various other arrangements may be devised by one skilled in the art without departing from the spirit and scope thereof as defined by the accompanying claims. In particular, the number of flip-flops in each register and the size of the memory may be varied by one skilled in the art to provide an optimum circuit according to this invention for a particular application. The defining relationships of the linear feedback shift register 200 and the non linear finite state machine 300, namely the feedback connections and initial conditions of the linear feedback shift register 200 and the memory contents and initial conditions of flip-flops 330 through 333 of non linear finite state machine 300, may be chosen by one skilled in the art for a given application.

We claim:

1. A digital data enciphering and deciphering circuit comprising:
   a data input;
   a clock input;
   a start signal input;
   a data output;
   linear feedback shift register means comprising: a first input connected to said start signal input, a second input connected to said clock input, an output and means for generating at said linear feedback shift register means output a pseudorandom signal;
   nonlinear finite state machine means comprising: a first input connected to said start signal input, a second input connected to said clock input, a third input connected to said output of said linear feedback shift register, an output and means for generating at said output of said nonlinear finite state machine means a nonlinear pseudorandom signal corresponding to said pseudorandom signal present at said linear feedback shift register means output such that said pseudorandom signal present at said linear feedback shift register output can not be translated into said nonlinear pseudorandom signal by means of a linear sequential machine means comprising: unit delays, module p adders and modulo p scalar multipliers connected such that every closed loop contains at least one unit delay element, where p is the number base of the logic system used to construct such a linear sequential machine, and such that the output combinations of said nonlinear finite state machine means are randomly distributed; and
   combining means comprising: a first input connected to said output of said nonlinear finite state machine means, a second input connected to said data input, and output connected to said data output and means for combining said nonlinear pseudorandom signal with digital data present on said data input to generate transformed digital data on said data output.

2. A digital data enciphering and deciphering circuit according to claim 1 wherein said nonlinear finite state machine means further comprises:
   a transition table, such that all entries corresponding to each certain input combination present on said third input of said nonlinear finite state machine means generate a set of output signals on said output of said nonlinear finite state machine means which are randomly distributed in the sense that each output signal combination occurs a number of times equal to the number of times of occurance of every other output signal combination.

3. A method of enciphering and deciphering digital data, said method comprising the steps of:
   generating a pseudorandom key by means of a linear feedback shift register;
   transforming said pseudorandom key into a nonlinear pseudorandom key by means of a nonlinear finite state machine such that said pseudorandom key can not be transformed into said nonlinear pseudorandom key by means of a linear sequential machine means comprising: unit delays, modulo p adders and modulo p scalar multipliers connected such that every closed loop contains at least one unit delay element, where p is the number base of the logic system used to construct such a linear sequential machine, and such that the combinations of said nonlinear pseudorandom key are randomly distributed; and
   combining said nonlinear pseudorandom key with data present at an input to generate transformed data at an output.

4. A digital data enciphering and deciphering circuit connected to a source of plaintext data comprising:
   a linear feedback shift register circuit of maximal length period comprising: an output and means for generating a key signal with certain random properties at said output;
   a nonlinear finite state machine circuit comprising: an input connected to said output of said linear feedback shift register, an output and means for transforming the signal present at said input into a corresponding signal at said output such that said linear feedback shift register output can not be transformed into said corresponding signal at said output by means of a linear sequential machine comprising: unit delays, modulo p adders and modulo p scalar multipliers connected such that every closed loop contains at least one unit delay element, where p is the number base of the logic system used to construct such a linear sequential machine and such that the combinations of said corresponding signal are randomly distributed; and
   a combining circuit comprising: a first input connected to said output of said nonlinear finite state machine, a second input connected to said plaintext data source, an output and means for generating at said output an enciphered version of said plaintext data.

5. A method of enciphering and deciphering digital data, said method comprising the steps of:
   generating a first pseudorandom key;
   transforming said first pseudorandom key into a first nonlinear pseudorandom key by means of a first nonlinear finite state machine such that said first pseudorandom key can not be transformed into said first nonlinear pseudorandom key by means of a linear sequential machine means comprising: unit delays, modulo p adders and modulo p scalar multipliers connected such that every closed loop contains at least one unit delay element, where p is the number base of the logic system used to construct such a linear sequential machine, and such that the combinations of said first nonlinear pseudorandom key are randomly distributed;
   combining said first nonlinear key with plaintext data from a message source resulting in ciphertext data;
   transmitting said ciphertext data to a receiver;

generating a second pseudorandom key, identical to said first pseudorandom key, at said receiver;

transforming said second pseudorandom key into a second nonlinear pseudorandom key by means of a second nonlinear finite state machine identical to said first nonlinear finite state machine; and combining said ciphertext data with said second nonlinear key resulting in plaintext data.

* * * * *